(12) United States Patent
Dufour et al.

(10) Patent No.: US 7,905,687 B2
(45) Date of Patent: Mar. 15, 2011

(54) CUTTING INSERT, TOOL HOLDER, AND RELATED METHOD

(75) Inventors: Jean-Luc D. Dufour, Franklin, TN (US); X. Daniel Fang, Brentwood, TN (US); David J. Wills, Brentwood, TN (US); Gilles Festeau, Ferney Voltaire (FR); Thomas B. Hartman, Murfreesboro, TN (US)

(73) Assignee: TDY Industries, Inc., Pittsburgh, PA (US)

( * ) Notice: Subject to any disclaimer, the term of this patent is extended or adjusted under 35 U.S.C. 154(b) by 0 days.

(21) Appl. No.: 11/743,803

(22) Filed: May 3, 2007

(65) Prior Publication Data

US 2008/0170919 A1    Jul. 17, 2008

Related U.S. Application Data

(60) Provisional application No. 60/885,053, filed on Jan. 16, 2007.

(51) Int. Cl.
*B23C 5/20* (2006.01)
(52) U.S. Cl. .......................................... 407/42; 407/113
(58) Field of Classification Search .................. 407/113, 407/42, 48, 53, 61; *B23C 5/20*
See application file for complete search history.

(56) References Cited

U.S. PATENT DOCUMENTS

| | | | |
|---|---|---|---|
| 3,399,442 A | 9/1968 | Jones et al. | |
| 3,557,416 A | 1/1971 | Jones | |
| 3,621,549 A * | 11/1971 | Billups | 407/3 |
| 3,806,713 A | 4/1974 | Ryberg | |
| 4,274,766 A | 6/1981 | Raupp et al. | |
| 4,294,565 A | 10/1981 | Erkfritz | |
| 4,461,602 A | 7/1984 | Zettl | |
| 4,493,596 A | 1/1985 | Grunsky et al. | |
| 4,595,322 A | 6/1986 | Clement | |
| 4,659,264 A * | 4/1987 | Friedline | 408/204 |
| 4,681,488 A | 7/1987 | Markusson | |
| 4,699,549 A | 10/1987 | Shimomura et al. | |
| 4,760,548 A | 7/1988 | Baker et al. | |
| 4,940,369 A * | 7/1990 | Aebi et al. | 407/42 |

(Continued)

FOREIGN PATENT DOCUMENTS

CN        1041499 C       1/1999

(Continued)

OTHER PUBLICATIONS

U.S. Appl. No. 12/116,489, filed May 7, 2008, 36 pages.

(Continued)

*Primary Examiner* — Boyer D Ashley
*Assistant Examiner* — Sara Addisu
(74) *Attorney, Agent, or Firm* — K & L Gates LLP; Patrick J. Viccaro; John E. Grosselin, III

(57) ABSTRACT

A generally parallelogram-shaped cutting insert includes a top face; first and second main radial clearance faces, each intersecting the top face; first and second minor axial clearance faces each intersecting the top face and connecting the first and second main radial clearance faces; and a main cutting edge at the intersection of the top face and the first main radial clearance face. According to one non-limiting embodiment, the main cutting edge comprises a variable radial rake angle including a portion having a positive radial rake angle and a portion having a negative radial rake angle.

38 Claims, 9 Drawing Sheets

U.S. PATENT DOCUMENTS

| | | | | |
|---|---|---|---|---|
| 5,052,863 A | * | 10/1991 | Satran | 407/113 |
| 5,071,292 A | * | 12/1991 | Satran | 407/116 |
| 5,092,718 A | | 3/1992 | Shallenberger | |
| 5,094,572 A | | 3/1992 | Alsbury et al. | |
| 5,137,398 A | | 8/1992 | Omori et al. | |
| 5,145,295 A | * | 9/1992 | Satran | 407/113 |
| 5,193,946 A | | 3/1993 | Arai et al. | |
| 5,203,649 A | | 4/1993 | Katbi et al. | |
| 5,226,761 A | | 7/1993 | Satran et al. | |
| 5,244,318 A | * | 9/1993 | Arai et al. | 407/42 |
| 5,246,315 A | | 9/1993 | Hansson et al. | |
| 5,333,972 A | | 8/1994 | Bernadic et al. | |
| 5,338,135 A | | 8/1994 | Noguchi et al. | |
| 5,340,246 A | | 8/1994 | Tukala | |
| 5,346,336 A | | 9/1994 | Rescigno | |
| 5,377,116 A | | 12/1994 | Wayne et al. | |
| 5,388,932 A | * | 2/1995 | DeRoche et al. | 407/113 |
| 5,408,598 A | | 4/1995 | Pryor, Jr. | |
| 5,443,335 A | * | 8/1995 | Shimano et al. | 407/113 |
| 5,454,670 A | | 10/1995 | Noda et al. | |
| 5,474,407 A | | 12/1995 | Rodel et al. | |
| 5,586,843 A | * | 12/1996 | Minicozzi | 407/42 |
| 5,593,255 A | | 1/1997 | Satran et al. | |
| 5,634,745 A | | 6/1997 | Wiman et al. | |
| 5,658,100 A | | 8/1997 | Deiss et al. | |
| 5,688,081 A | | 11/1997 | Paya | |
| 5,725,334 A | | 3/1998 | Paya | |
| 5,762,453 A | | 6/1998 | Arai et al. | |
| 5,791,831 A | * | 8/1998 | Shimano et al. | 407/113 |
| 5,791,833 A | | 8/1998 | Nielbauer | |
| 5,791,883 A | | 8/1998 | Ban et al. | |
| 5,803,674 A | * | 9/1998 | Satran et al. | 407/42 |
| 5,951,212 A | | 9/1999 | Emoto et al. | |
| 5,957,629 A | | 9/1999 | Hessman et al. | |
| 5,957,635 A | | 9/1999 | Nuzzi et al. | |
| 5,971,676 A | | 10/1999 | Kojima | |
| 6,050,752 A | | 4/2000 | DeRoche | |
| 6,053,671 A | | 4/2000 | Stedt et al. | |
| 6,100,904 A | | 8/2000 | Gupta | |
| 6,142,716 A | * | 11/2000 | Jordberg et al. | 407/114 |
| 6,152,658 A | | 11/2000 | Satran et al. | |
| 6,186,705 B1 | | 2/2001 | Kumar et al. | |
| 6,238,133 B1 | | 5/2001 | DeRoche et al. | |
| 6,244,791 B1 | | 6/2001 | Wiman et al. | |
| 6,270,297 B1 | | 8/2001 | Fang et al. | |
| 6,540,448 B2 | | 4/2003 | Johnson | |
| 6,543,970 B1 | | 4/2003 | Qvarth et al. | |
| 6,623,217 B2 | | 9/2003 | Brockett et al. | |
| 6,655,881 B2 | | 12/2003 | Shimizu | |
| 6,669,412 B1 | | 12/2003 | Hirose et al. | |
| 6,684,742 B1 | | 2/2004 | White | |
| 6,715,967 B2 | | 4/2004 | Wiman et al. | |
| 6,722,824 B2 | | 4/2004 | Satran et al. | |
| 6,769,844 B2 | | 8/2004 | Waggle | |
| 6,835,028 B2 | | 12/2004 | Usui et al. | |
| 6,884,006 B2 | | 4/2005 | Nagashima | |
| 6,921,233 B2 | | 7/2005 | Duerr et al. | |
| 6,929,427 B2 | | 8/2005 | Satran | |
| 6,929,429 B2 | | 8/2005 | Riviére | |
| 6,957,935 B2 | | 10/2005 | Sung et al. | |
| 6,960,049 B2 | | 11/2005 | Inayama | |
| 7,037,051 B2 | | 5/2006 | Wermeister | |
| 7,070,363 B2 | | 7/2006 | Long, II et al. | |
| 7,220,083 B2 | | 5/2007 | Festeau et al. | |
| 7,232,279 B2 | | 6/2007 | Smilovici et al. | |
| 7,234,899 B2 | | 6/2007 | Fang et al. | |
| 7,241,082 B2 | | 7/2007 | Smilovici et al. | |
| 7,281,884 B2 | | 10/2007 | Maeda | |
| 7,306,409 B2 | | 12/2007 | Stabel et al. | |
| 7,325,471 B2 | | 2/2008 | Massa et al. | |
| 7,393,163 B2 | | 7/2008 | Edvardsson et al. | |
| 2003/0031520 A1 | | 2/2003 | Hintze et al. | |
| 2003/0206777 A1 | * | 11/2003 | Gyllengahm | 407/102 |
| 2003/0226694 A1 | * | 12/2003 | Moseley | 175/404 |
| 2006/0115340 A1 | | 6/2006 | Nishio et al. | |
| 2006/0245837 A1 | | 11/2006 | Dufour et al. | |
| 2007/0189864 A1 | | 8/2007 | Festeau et al. | |
| 2009/0097929 A1 | | 4/2009 | Festeau et al. | |
| 2009/0279962 A1 | | 11/2009 | Dufour et al. | |
| 2010/0080662 A1 | | 4/2010 | Satran et al. | |
| 2010/0183386 A1 | | 7/2010 | Heinloth et al. | |
| 2010/0202839 A1 | | 8/2010 | Fang et al. | |

FOREIGN PATENT DOCUMENTS

| | | |
|---|---|---|
| CN | 1041901 C | 2/1999 |
| CN | 1045557 C | 10/1999 |
| CN | 13879970 A | 1/2003 |
| CN | 1117646 C | 8/2003 |
| DE | 4118070 C2 | 2/1995 |
| DE | 4400538 A1 | 7/1995 |
| EP | 0035848 B1 | 2/1985 |
| EP | 0285660 A1 | 10/1988 |
| EP | 0239045 B1 | 10/1990 |
| EP | 1157768 A1 | 11/2001 |
| EP | 1205877 A1 | 5/2002 |
| EP | 1346789 B1 | 11/2006 |
| EP | 1749602 A2 | 2/2007 |
| FR | 2364724 A1 | 4/1978 |
| GB | 2298600 A | 9/1996 |
| JP | 52-103081 A | 8/1977 |
| JP | 59-214501 A | 12/1984 |
| JP | 5-285708 A | 11/1993 |
| JP | 8-039329 | 2/1996 |
| JP | 8-174237 A | 7/1996 |
| JP | 2002-301603 | 10/2002 |
| JP | 2003-275920 | 9/2003 |
| SU | 344930 A | 8/1972 |
| SU | 814573 A1 | 3/1981 |
| SU | 1504006 A1 | 8/1989 |
| WO | WO 92/21467 A1 | 12/1992 |
| WO | WO 94/12302 A1 | 6/1994 |
| WO | WO 95/00272 A1 | 1/1995 |
| WO | WO 95/32071 A1 | 11/1995 |
| WO | WO 96/35538 A1 | 11/1996 |
| WO | WO 02/18083 A2 | 3/2002 |
| WO | WO 02/102536 A1 | 12/2002 |
| WO | WO 03/099495 A1 | 12/2003 |
| WO | WO 2004/096474 A1 | 11/2004 |
| WO | WO 2006/041353 A1 | 4/2006 |

OTHER PUBLICATIONS

Bourke, Paul, "Spline Curves (in 3D)", Nov. 1996, XP002300113, printed from http://astronomy.swin.edu.au/~pbourke/curves/spline/, 5 pages.

Shi dongping, et al., CAD/CAM for Cemented Carbide Indexable Inserts, J. Huazhong Univ. of Sci. & Tech., vol. 22, No. 2, Feb. 1994, with English abstract, 4 pages.

Shaw et al., "The Rotary Cutting Tool," Transactions of the ASME, Aug. 1952, Cambridge, Massachusetts, pp. 1065-1076.

Armarego et al., "Fundamental Studies of Driven and Self-Propelled Rotary Tool Cutting Processes—I. Theoretical Investigation," Int. J. Mach. Tools Maufact., vol., 34, No. 6, pp. 785-801.

Davis et al., Metals Handbook Ninth Edition, vol. 16, Machining, 1989, p. 311.

U.S. Appl. No. 12/641,399, filed Dec. 18, 2009.

U.S. Appl. No. 12/431,384, filed Apr. 28, 2009.

U.S. Appl. No. 12/841,206, filed Jul. 22, 2010.

Milling Cutters and End Mills, The American Society of Mechanical Engineers, An American National Standard, ASME B94.19-1997, Revision of ANSI/ASME B94.19/1985, pp. 2-4.

Fundamentals of Tool Design, Fourth Edition, revised by Dr. John G. Nee, CMfgE, Society of Manufacturing Engineers, 1998, p. 103.

Oberg et al., 26th Edition Machinery's Handbook, A Reference Book for the Mechanical Engineer, Designer, Manufacturing Engineer, Draftsman, Toolmaker, and Machinist, Industrial Press Inc., New York, 2000, pp. 723-724.

U.S. Appl. No. 12/854,382, filed Aug. 11, 2010.

\* cited by examiner

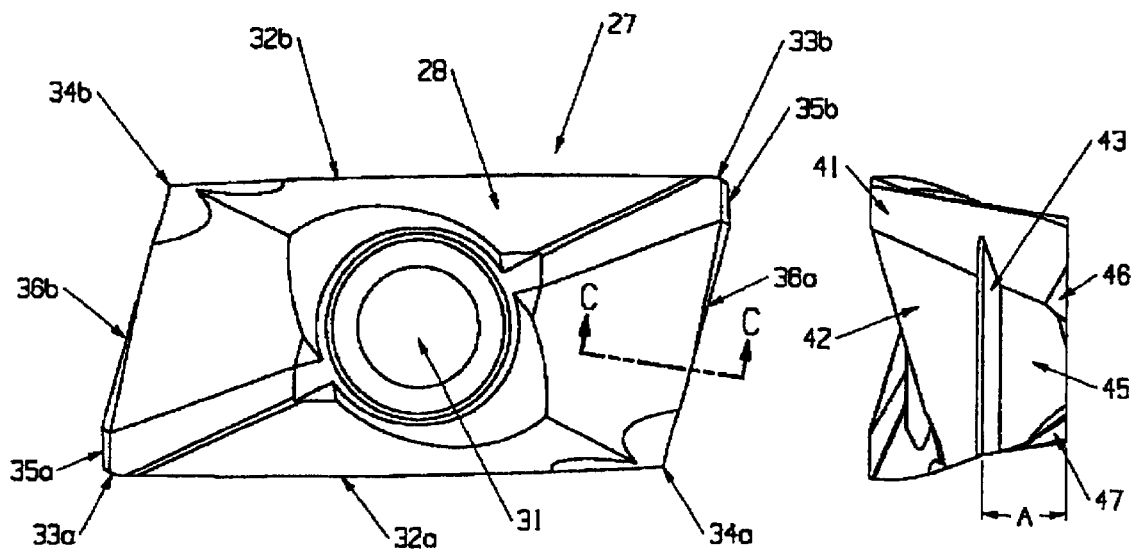
Figure 3a
Figure 3c
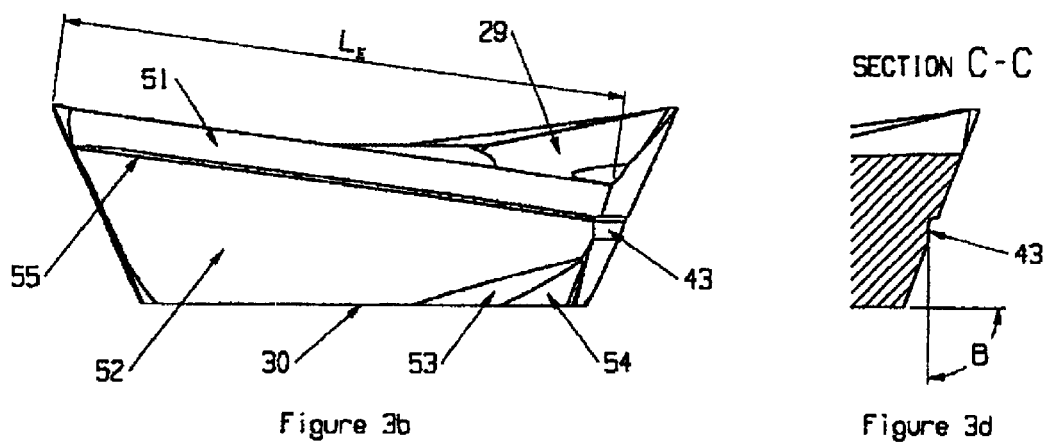
Figure 3b
SECTION C-C
Figure 3d
Figure 3

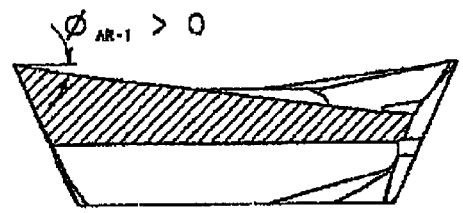
SECTION AY-AY
Figure 4b
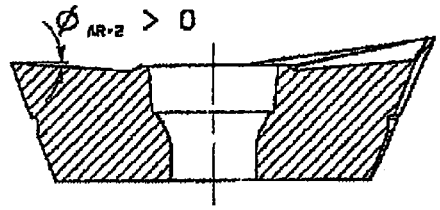
SECTION AZ-AZ
Figure 4c
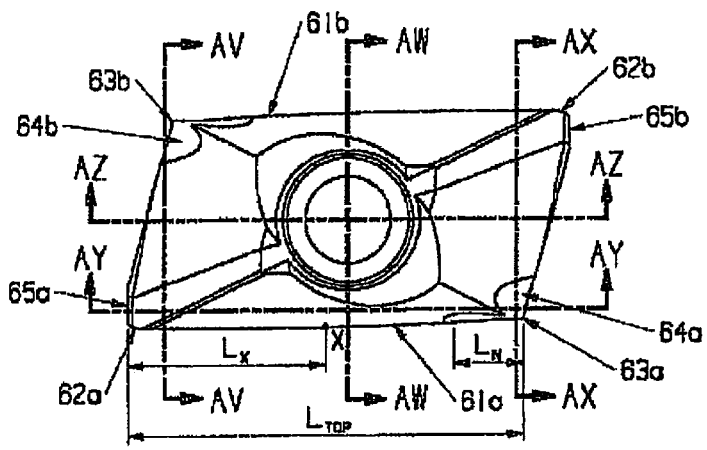
Figure 4a
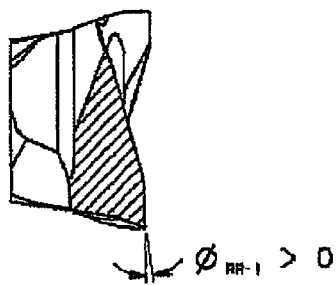
SECTION AV-AV
Figure 4d
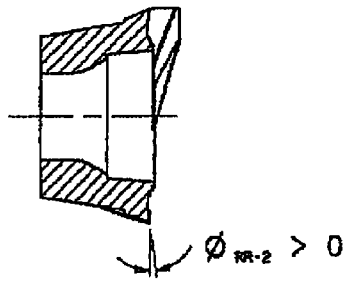
SECTION AW-AW
Figure 4e
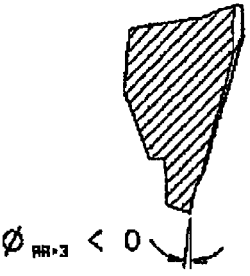
SECTION AX-AX
Figure 4f
Figure 4

CUTTING INSERT, TOOL HOLDER, AND RELATED METHOD

CROSS-REFERENCE TO RELATED APPLICATIONS

The present application claims priority under 35 U.S.C. §119(e) to co-pending U.S. provisional patent application Ser. No. 60/885,053, filed Jan. 16, 2007.

TECHNICAL FIELD

The present disclosure is directed to cutting inserts and tool holders for replaceable and indexable cutting inserts. In one non-limiting embodiment, cutting inserts according to the present disclosure are particularly useful in peripheral rotary milling applications for machining difficult-to-machine materials.

BACKGROUND OF THE TECHNOLOGY

Cutting inserts suffer from a limited service life in peripheral rotary milling applications, especially when machining difficult-to-machine materials. Difficult-to-machine materials include, for example, specialty metals such as titanium and titanium alloys, nickel and nickel alloys, superalloys, and certain exotic metals. Cutting inserts comprising a positive rake face geometry on both the axial cutting face and the radial cutting face are commonly employed in milling operations involving the use of a peripheral rotary tool holder with an indexable capability. The positive cutting geometry of the inserts reduces the cutting forces and consequently reduces power consumption, resulting in a more efficient milling operation. In addition, the cutting inserts typically used in peripheral rotary milling are generally parallelogram-shaped (i.e., each has a generally parallelogram-shaped profile when viewed from a point above the insert's top surface), with two long sides forming two main cutting edges and two short sides forming two minor cutting edges. These types of cutting inserts provide more efficient machining by providing the capability of a larger depth of cut, though such inserts are not as strong as square-shaped cutting inserts.

European Patent No. 0 239 045 provides a parallelogram-shaped cutting insert having a constant positive radial rake angle and a constant radial clearance angle along the major cutting edges.

U.S. Pat. No. 5,071,292 describes a parallelogram-shaped cutting insert having a continuous curved radial cutting face and radial clearance face wherein both the radial rake angle and the radial clearance angle remain substantially the same along the main cutting edge with respect to the associated cutter or tool holder.

U.S. Pat. No. 5,052,863 provides a method for securely locating a parallelogram-shaped cutting insert having a relatively large positive radial clearance angle along the main cutting edge in a tool holder. The method involves adapting a tool holder designed to accommodate an insert having a lower radial clearance angle, to overcome the strength problems associated with greater unsupported overhang when using the parallelogram-shaped cutting inserts having larger radial clearance angle.

U.S. Pat. No. 5,388,932 describes an angled chamfer at the elevated corner nose area of a parallelogram-shaped cutting insert, wherein the angled chamfer increases the cutting edge strength at the main corner nose while maintaining a positive radial rake angle along the main cutting edge.

U.S. Pat. No. 6,142,716 also describes an angled chamfer with a positive radial rake angle, but further comprises a recess at the major cutting sides enabling more rigid localization of the cutting insert in the tool holder and use of less material in manufacturing the cutting insert.

Efforts in the industry to develop new or improved parallelogram-shaped cutting inserts have been directed toward achieving reduced cutting forces, reduced power consumption, increased cutting edge strength, and increased tool life. From the point view of geometrical design, maintaining a positive or a positive plus constant radial rake angle along the main cutting edge has been a fundamental goal of these efforts.

The position of the cutting insert in the associated tool holder may also contribute to achieving the goals of reducing cutting forces and increasing cutting edge strength. Known patent publications and published literature regarding parallelogram-shaped cutting inserts including those described above do not recognize a quantitative relationship between the cutting insert geometry and the position of the cutting insert in the associated tool holder.

Therefore, there is a need for an improved parallelogram-shaped cutting insert and for a milling cutting tool system including plural cutting inserts and a tool holder providing a more efficient and more effective method for machining difficult-to-machine materials.

SUMMARY OF THE INVENTION

According to one non-limiting aspect of the present disclosure, a generally parallelogram-shaped cutting insert is provided, comprising: a top face; first and second main radial clearance faces, each intersecting the top face; first and second minor axial clearance faces each intersecting the top face and connecting the first and second main radial clearance faces; and a main cutting edge at the intersection of the top face and the first main radial clearance face. According to one non-limiting embodiment, the main cutting edge comprises a variable radial rake angle including a portion having a positive radial rake angle and a portion having a negative radial rake angle.

According to another non-limiting aspect of the present disclosure, a peripheral cutting tool is provided comprising a tool holder including at least one insert pocket. A cutting insert may be located in the at least one insert pocket of the tool holder such that a midpoint of the main cutting edge of the cutting insert is located in a radial plane comprising the axis of rotation of the tool holder, and wherein a support plane including a bottom surface of the insert pocket is perpendicular to a secondary radial plane. The secondary radial plane comprises the axis of rotation of the tool holder and is perpendicular to the primary radial plane.

According to yet another non-limiting aspect of the present disclosure, a method is provided for positioning a cutting insert comprising a main cutting edge in an insert pocket of a tool holder of peripheral cutting tool. The method comprises positioning the cutting insert in the insert pocket so that a midpoint of the main cutting edge is located in a primary radial plane comprising the axis of rotation of the tool holder, and wherein a support plane including a bottom surface of the insert pocket is perpendicular to a secondary radial plane that comprises the axis of rotation of the tool holder and is perpendicular to the primary radial plane.

BRIEF DESCRIPTION OF THE FIGURES

Certain non-limiting embodiments according to the present disclosure will be understood by reference to the following figures, wherein:

FIGS. 3a, 3b, 3c, and 3d are views illustrating features of one non-limiting embodiment of a parallelogram-shaped cutting insert according to the present disclosure;

FIGS. 4a, 4b, 4c, 4d, 4e, and 4f are various views illustrating the pattern of radial rake angles along the main cutting edge and axial rake angles along the minor cutting edge for one non-limiting embodiment of a parallelogram-shaped cutting insert according to the present disclosure;

Figure 1:
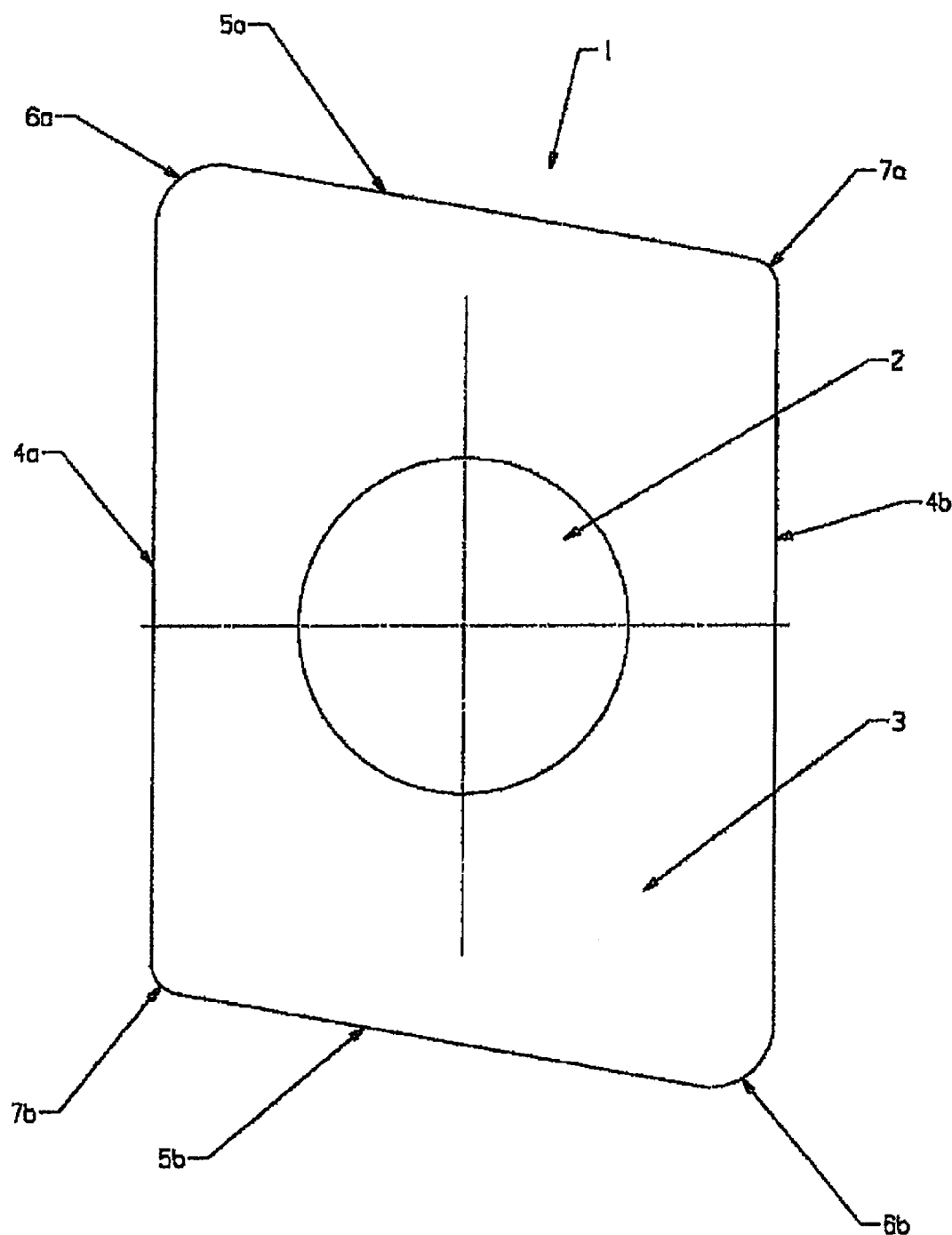
FIG. 1 is a simplified drawing of a top view of a parallelogram-shaped cutting insert showing certain basic elements of the cutting insert.

The reader will appreciate the foregoing details, as well as others, upon considering the following detailed description of certain non-limiting embodiments of apparatus and methods according to the present disclosure. The reader also may comprehend certain of such additional details upon carrying out or using the apparatus and methods described herein.

DETAILED DESCRIPTION OF CERTAIN NON-LIMITING EMBODIMENTS

In the present description of non-limiting embodiments and in the claims, other than in the operating examples or where otherwise indicated, all numbers expressing quantities or characteristics of ingredients and products, processing conditions, and the like are to be understood as being modified in all instances by the term "about". Accordingly, unless indicated to the contrary, any numerical parameters set forth in the following description and the attached claims are approximations that may vary depending upon the desired properties one seeks to obtain in the apparatus and methods according to the present disclosure. At the very least, and not as an attempt to limit the application of the doctrine of equivalents to the scope of the claims, each numerical parameter should at least be construed in light of the number of reported significant digits and by applying ordinary rounding techniques.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein is only incorporated to the extent that no conflict arises between that incorporated material and the existing disclosure material.

Cutting tool life becomes a critical factor in efficient peripheral rotary milling applications for machining difficult-to-machine materials, particularly specialty metals. Parallelogram-shaped cutting inserts are typically used in peripheral rotary milling due to their relatively large depth of cut obtained by the relatively longer main cutting edge as compared to square cutting inserts. The longer main cutting edge, however, increases the load on the cutting insert. To effectively overcome the increased cutting edge load problems while providing an efficient positive cutting action for applications involving machining difficult-to-machine materials, there is a need for an improved design of a cutting tool system including parallelogram-shaped cutting inserts and an associated tool holder.

Certain non-limiting embodiments according to the present disclosure include a generally parallelogram-shaped cutting insert comprising: a top face; first and second main radial clearance faces, each intersecting the top face; first and second minor axial clearance faces, each intersecting the top face and connecting the first and second main radial clearance faces; and a main cutting edge at the intersection of the top face and the first main radial clearance face. Certain non-limiting embodiments may further comprise a variable radial rake angle along the length of the main cutting edge comprising a portion having a positive radial rake angle and a portion having a negative radial rake angle. The variable radial rake angle of the cutting insert changes, preferably gradually, from a positive radial rake angle to a negative radial rake angle. The result is that in certain embodiments, the radial rake angle near the main cutting corner is positive, and the radial rake angle near the minor cutting corner is negative. Such a design provides a stronger cutting edge with a longer service life than a parallelogram-shaped cutting insert having a positive radial rake angle across the entire cutting edge.

Certain non-limiting embodiments of a parallelogram-shaped cutting insert according to the present disclosure comprise a main corner nose. The main corner nose provides a significant portion of the active cutting action by the cutting insert. In certain non-limiting embodiments, the portion of the main cutting edge comprising the positive radial rake angle is longer than the portion of the main cutting edge comprising the negative radial rake angle. Also, in certain non-limiting embodiments, the portion of the main cutting edge comprising a positive radial rake angle is at least three times longer than the portion of the main cutting edge comprising a negative radial rake angle. In yet other non-limiting embodiments, the portion of the main cutting edge comprising a positive radial rake angle is at least seven times longer than the portion of the main cutting edge comprising a negative radial rake angle. Non-limiting cutting insert embodiments according to the present disclosure comprise at least one point wherein the radial rake angle is zero, and one of the points having a zero rake angle is between the portion of the main cutting edge comprising the positive radial rake angle and the portion of the main cutting edge comprising the negative radial rake angle.

Parallelogram-shaped cutting inserts are typically indexable and often comprise a first main cutting edge at the intersection of the top face and the first main radial clearance face and a second cutting edge at the intersection of the top face and the second main radial clearance face. In certain non-limiting embodiments according to the present disclosure, each cutting edge comprises a variable radial rake angle along the length of the cutting edge, comprising a portion having a positive radial rake angle and a portion having a negative radial rake angle.

Figure 2:
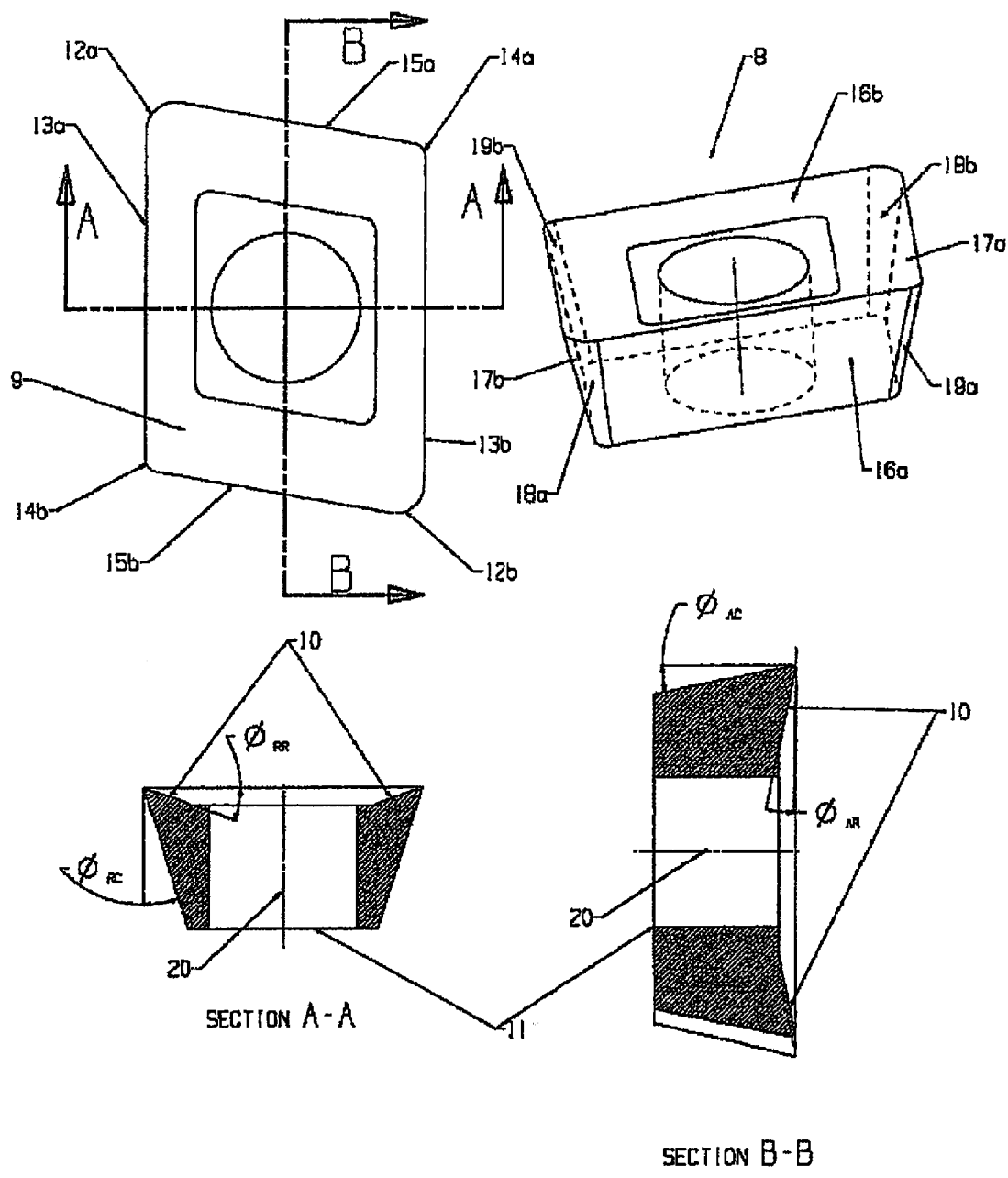
FIG. 2 includes simplified drawings of various views of a parallelogram-shaped cutting insert showing certain basic elements.

FIGS. 1 and 2 are simplified drawings of parallelogram-shaped cutting inserts showing some basic elements. FIG. 1 is a top view of parallelogram-shaped cutting insert 1 that includes a center hole 2 for securing the cutting insert 1 to a tool holder; a top face 3 (the top face of a parallelogram-shaped cutting insert may comprise a flat face, an angled flat face, or a curved surface); two main cutting edges 4a and 4b; two minor cutting edges 5a and 5b; two main corner noses 6a and 6b; and two minor corner noses 7a and 7b.

FIG. 2 is a set of drawings of different simplified views of an embodiment of another parallelogram-shaped cutting insert 8 comprising: a top face 9 having rake cutting face 10 (functioning as a chip breaker to promote chip flow/chip breaking during machining); a bottom face 11; two main corner noses 12a and 12b; two main radial cutting edges 13a and 13b; two minor corner noses 14a and 14b; two minor cutting edges 15a and 15b; two radial clearance faces 16a and 16b below the two main cutting edges 13a and 13b; two axial clearance faces 17a and 17b below the two minor cutting edges 15a and 15b; two conical clearance faces 18a and 18b below the main corner noses 12a and 12b; and two conical clearance faces 19a and 19b below the minor corner noses 14a and 14b. In sectional view A-A of FIG. 2, the radial clearance angle $\varnothing_{RC}$ is formed between the cutting insert center axis 20 and the radial clearance face 16a (or 16b). The radial rake angle $\varnothing_{RR}$ is formed between the top flat plane (a plane that is parallel to the bottom surface and intersects the cutting edge) and the rake cutting face 10. In sectional view B-B of FIG. 2, the axial clearance angle $\varnothing_{AC}$ is formed between the cutting insert center axis 20 and the axial clearance face 17a (or 17b), and the axial rake angle $\varnothing_{AR}$ is formed between the top flat plane and the rake cutting face 10.

Typical parallelogram-shaped cutting inserts are significantly more complicated than those shown in FIGS. 1 and 2, which show only certain basic elements with less detail for the sake of clarity.

FIG. 3 is a set of views illustrating some more detailed features of a non-limiting embodiment of a parallelogram-shaped cutting insert 27 according to the present disclosure, having a top face 28 with a chip breaker 29, a bottom surface 30, and a center hole 31. The cutting insert 27 includes: two main radial cutting edges 32a and 32b (which in this embodiment are curved cutting edges with a relatively large radius); two main corner noses 33a and 33b; two minor corner noses 34a and 34b; and two minor cutting edges, each of which includes two portions, i.e., a first portion 35a (or 35b) connecting to the main corner nose 33a (or 33b) and a second portion 36a (or 36b) connecting to the minor corner nose 34a (or 34b). In particular, the first portion of the minor radial cutting edge 35a (or 35b), a facet edge, may be a line parallel to the bottom face 30. The second portion of the minor cutting edge 36a (or 36b) is at an angle to the facet edge 35a (or 35b) and would not usually participate in cutting the material. The main corner noses 33a and 33b are at the highest points of the embodiment of cutting insert 27, while the minor corner noses 34a and 34b are at the lowest points, when viewed from the side as shown in FIG. 3b. In such an embodiment, the main cutting edges 32a, 32b and the second portion of the minor cutting edges 36a, 36b are not parallel to the bottom surface 30 of the cutting insert 27.

The effective cutting length of the cutting insert 27 is defined as the length ($L_E$) as shown in FIG. 3b, which is measured parallel to the main cutting edge 32a (or 32b) from the first portion of the minor cutting edge or the facet edge 35a (or 35b) to the intersection point between the main cutting edge 32a (or 32b) and the minor corner noses 34a (or 34b). $L_E$ determines the maximal depth of cut of a parallelogram-shaped cutting insert when seated in a tool holder.

Cutting insert 27 has multiple (i.e., at least two) clearance faces below each of the cutting edges at the top face 28. In particular, the first axial clearance face 41, or the facet face, below the first portion of the minor cutting edge (35a or 35b) functions as a wiper contact face to improve the surface finish of the work materials in peripheral rotary milling operations (see FIG. 3c). The upper second axial clearance face 42 (see below) is formed right below the second portion of the minor cutting edge (36a or 36b).

As illustrated in FIGS. 3b, 3c, and 3d, one non-limiting embodiment of a parallelogram-shaped cutting insert according to the present disclosure comprises a notch 43 that extends across the entire second axial clearance face and separates it into an upper second axial clearance face 42 and a lower second axial clearance face 45. The notch 43 may form an angle A with respect to the bottom face 30. Angle A is 0 degrees in the embodiment shown in FIG. 3c (i.e., notch 43 is parallel to bottom face 30), but in certain embodiments may be up to 20 degrees. The notch is also grooved into the second axial clearance face at an angle B (see the cross-sectional view in FIG. 3d) ranging from, for example, 90 to 105 degrees with respect to the bottom face 30. A function of the notch 43 is to prevent the cutting insert 27 from slipping inside the pocket on a tool holder. The axial clearance faces 46 and 47 provide additional clearance for the cutting insert 27 in a tool holder.

On the main side of the embodiment of the cutting insert 27 shown in FIG. 3b, there are multiple radial clearance faces: upper radial clearance face 51, providing a cutting clearance angle for the main cutting edge; lower radial clearance face 52, which is a seating support surface for the cutting insert on the tool holder; and radial clearance faces 53 and 54, providing additional clearance for seating the cutting insert 27 in the tool holder. Cutting insert 27 also includes a notch 55 across the entire main side of the cutting insert, functioning as a separation between the upper radial clearance face 51 and lower radial clearance face 52. Similar to notch 43, notch 55 may have an angular shape, for example, a triangular or dovetail shape, or may have curved walls and be shaped as a semicircular groove.

Another feature of the embodiment shown as cutting insert 27 is illustrated in the various cross-sectional views of FIGS. 4b-f, wherein the radial rake angle ($\varnothing_{RR}$) along the main cutting edge 61a (or 61b) changes from positive near the main corner nose 62a (or 62b) to negative near the minor corner nose 63a (or 63b). Two concave surfaces 64a and 64b are formed near the minor corner noses 63a and 63b, respectively. The concave surface 64a (or 64b) is formed on the top face 28 with chip breaker 29 of cutting insert 27 and intersects with the main cutting edge 61a (or 61b), which in this embodiment is a curved cutting edge with a relatively large radius. At a point along each main cutting edge, typically in the concave section 64a or 64b, the rake angle will be zero. Certain non-limiting embodiments of the cutting insert of the present invention comprising a variable radial rake angle along the length of the cutting edge will not comprise a point where the rake angle is zero. For those embodiments comprising a point wherein the rake angle is zero, the distance measured in cutting insert's top view plane from the minor corner nose to the point at which the rake angle is zero is defined as. The distance $L_N$ for one embodiment is shown in FIG. 4a. Also, for certain non-limiting embodiments, the length of effective cutting edge ($L_E$ in FIG. 3b) may be projected onto the plane of the top view of FIG. 4a and defined as $L_{TOP}$. In various embodiments, the radial rake angle ($\varnothing_{RR}$) at different points along the main cutting edge 61a can be defined by the following equations:

$$L_N < L_{TOP}/4,$$

$$\varnothing_{RR\text{-}X} > 0, \text{ if } Lx < L_{TOP} - L_N$$

$$\varnothing_{RR\text{-}X} = 0, \text{ if } Lx = L_{TOP} - L_N$$

$$\varnothing_{RR\text{-}X} < 0, \text{ if } Lx > L_{TOP} - L_N \qquad \text{Eq. (1)}$$

where Lx is the length measured in the top view plane from the facet edge 65a to the point X along the main cutting edge where the radial rake angle $\varnothing_{RR\text{-}X}$ is measured.

The above relationships are illustrated by the cross-sectional views of FIGS. 4d, 4e and 4f, which provide examples of different radial rake angles ($\varnothing_{RR\text{-}X}$, X=1, 2, 3). Such a design maintains positive cutting along most of the main cutting edge, while enhancing the cutting edge strength near the minor corner nose. In the embodiment of the cutting insert of FIGS. 4b and 4c, the indicated axial rake angles ($\varnothing_{AR\text{-}X}$, X=1, 2) at the minor cutting edge are positive. In certain other possible cutting insert embodiments, however, the axial rake angle may be a variable radial rake angle comprising a portion having a positive radial rake angle and a portion having a negative radial rake angle.

Figure 5:
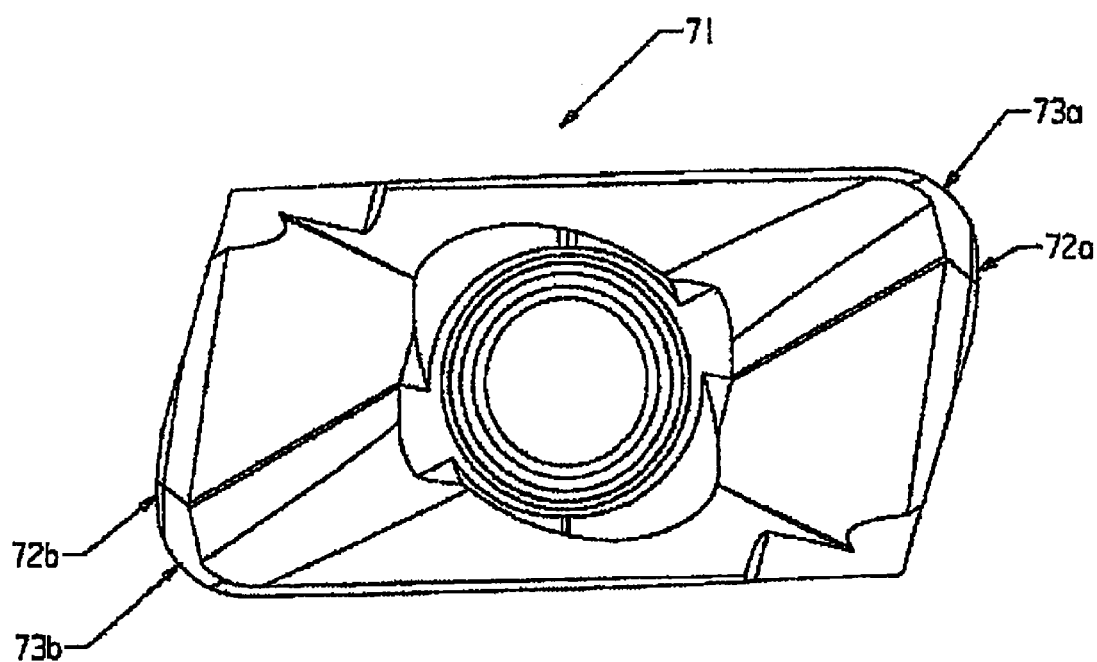
FIG. 5 shows an additional non-limiting embodiment of a parallelogram-shaped cutting insert according to the present disclosure wherein the curve of the main corner nose tangent to the facet edge differs from that of the parallelogram-shaped cutting insert shown in FIG. 3, wherein the main corner nose is truncated by the facet edge.

FIG. 5 shows another non-limiting embodiment of a parallelogram-shaped cutting insert 71 according to the present disclosure. The cutting insert 71 shown in FIG. 5 is different from the cutting insert 27 shown in FIGS. 3 and 4 at least in that the first portion of the minor cutting edge, or the facet edge, 72a (or 72b) is tangent to the main corner nose 73a (73b). Cutting insert 27 (FIG. 3) comprises a first portion of the minor cutting edge, or the facet edge, 35a (or 35b) that is not tangent to the main corner nose 33a (or 33b). In other words, the cutting insert shown in FIG. 5 has full main corner noses 73a and 73b, while the cutting insert shown in FIG. 3 has truncated main corner noses 33a and 33b.

In addition to improving the geometry of a cutting insert, a milling cutting tool system for machining difficult-to-machine materials may also be improved by modifying the associated tool holder to optimize how a parallelogram-shaped cutting insert is positioned in the insert pocket. In certain embodiments according to the present disclosure, a tool holder is provided that maintains a certain quantitative relationship between the geometry of a parallelogram-shaped cutting insert and its position in the associated tool holder to thereby provide balanced and optimized cutting performance for the cutting inserts and the tool holder.

Figure 6A:
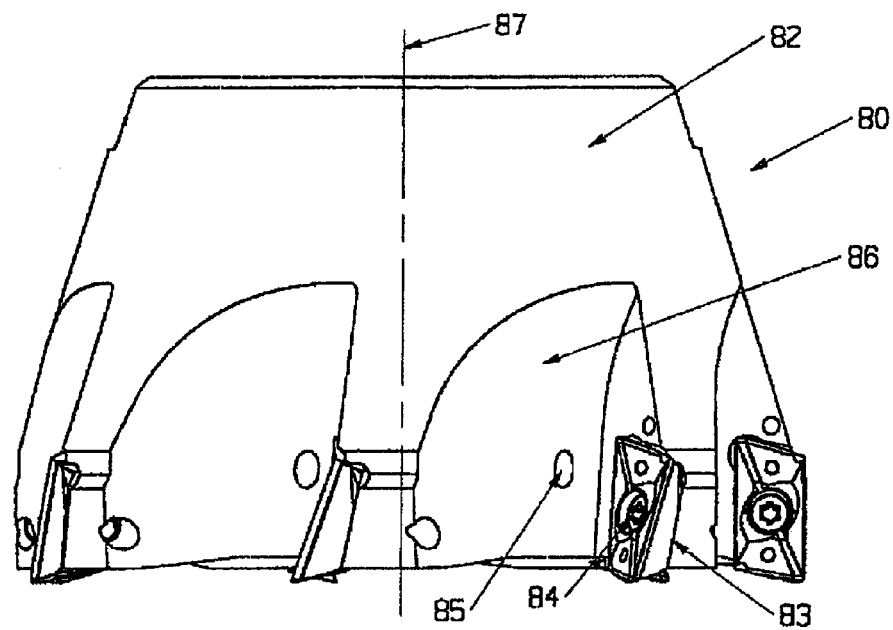
FIG. 6a is a side view and FIG. 6b is a front-end view of one non-limiting embodiment of a milling cutting tool system according to the present disclosure including seven identical parallelogram-shaped cutting inserts and an associated tool holder.
Figure 6B:
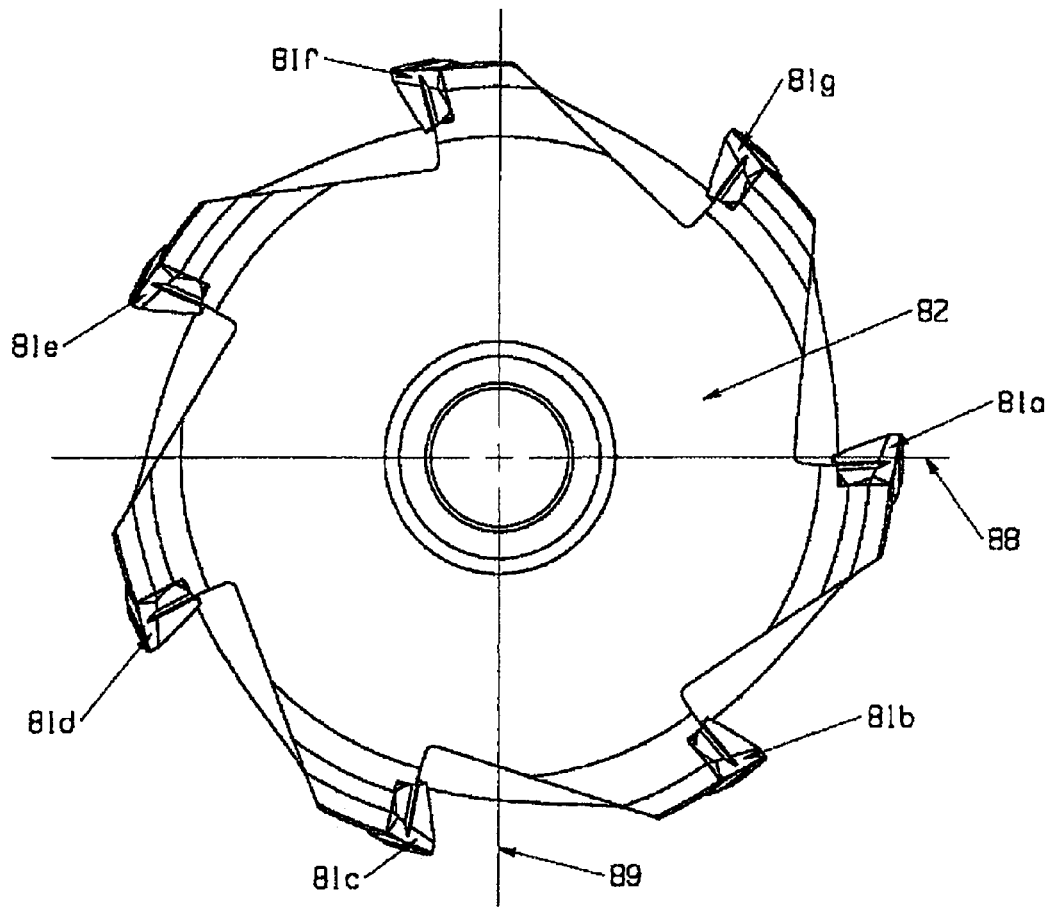

A non-limiting embodiment of a milling cutting tool system 80 according to the present disclosure including multiple parallelogram-shaped cutting inserts 81a, 81b, 81c, 81d, 81e, 81f, 81g seated in a tool holder 82 is shown in FIGS. 6a and 6b. The tool holder 82 has multiple insert pockets 83 to secure each cutting insert with a fastener, such as screw 84. The tool holder 82 may optionally comprise cooling hole 85 and relief surface 86 for each pocket. The tool holder 82 together with all cutting inserts rotates about its axial centerline 87. FIGS. 6a and 6b further show radial centerlines 88 and 89 of tool holder 82.

Figure 7:
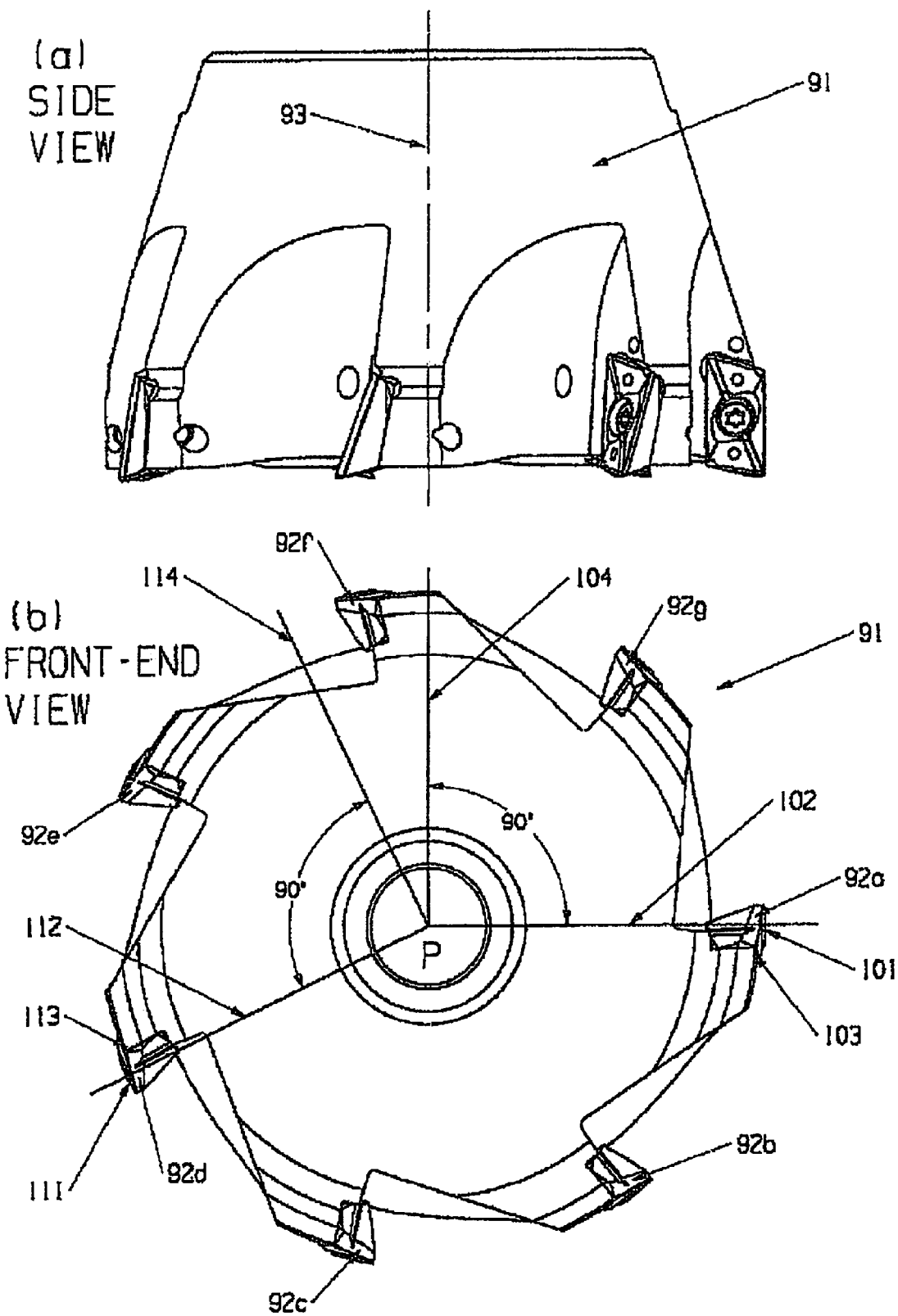
FIG. 7a is a side view and FIG. 7b is a front-end view of a non-limiting embodiment of a milling cutting tool system according to the present disclosure including seven identical parallelogram-shaped cutting inserts and an associated tool holder.

Certain non-limiting embodiments of a peripheral cutting tool according to the present disclosure comprise a tool holder comprising at least one insert pocket. The tool holder may have more than one insert pocket and typically comprises from 2-25 insert pockets. A cutting insert must be attached in each pocket. In one embodiment, the cutting insert comprises a main cutting edge. The inventors have found that the cutting operation may be performed more efficiently if the cutting insert is positioned in the insert pocket of the tool holder such that a midpoint of the main cutting edge is located in a radial plane comprising the axis of rotation of the tool holder. For example, as illustrated in FIG. 7, tool holder 91 has seven parallelogram-shaped cutting inserts, 92a, 92b, 92c, 92d, 92e, 92f and 92g. The axis of rotation 93 of the tool holder 91, shown in the side view of FIG. 7a, will appear on end as point P in the front view of FIG. 7b. Taking the cutting insert 92a as an example, the midpoint of the main cutting edge 101 is located in the primary radial plane 102 comprising the axis of rotation 93 (i.e. through the point P in FIG. 7b) of the tool holder 91. Secondary radial plane 104 is perpendicular to primary radial plane 102 and includes the axis of rotation 93. To locate the cutting insert according an aspect of the present disclosure, a support plane including the bottom surface 103 of the cutting insert 92a (or including the bottom surface of the insert pocket of toolholder 91) is also perpendicular to the secondary radial plane 104. In another example, cutting insert 92d comprises midpoint 111 of the main cutting edge. Midpoint 111 is located in the primary radial plane 112 comprising the axis of rotation 93 (i.e., through the point P in FIG. 7b) of the tool holder 91 and, at the same time, a plane including the bottom surface 113 of the cutting insert 92d is perpendicular to the secondary radial plane 114, which also comprises the axis of rotation 93 of the tool holder 91 and is perpendicular to the primary radial plane 112.

Figure 8:
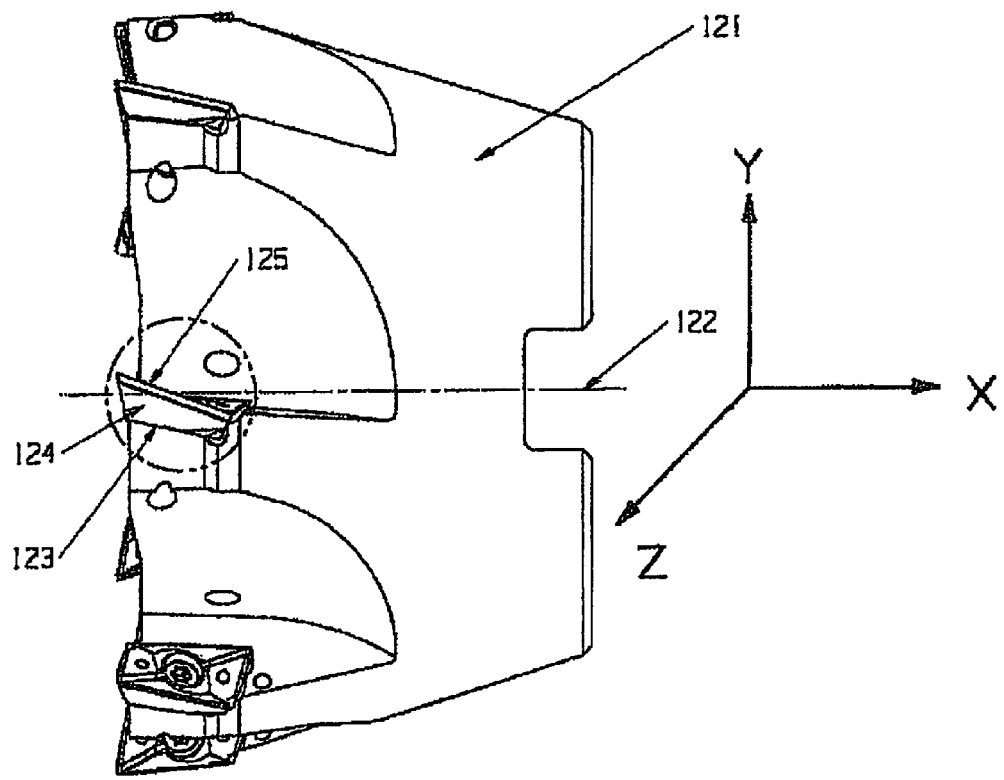
FIG. 8 provides a front-end view along with a magnified view of one cutting insert of a non-limiting embodiment of a milling cutting tool system according to the present disclosure including seven identical parallelogram-shaped cutting inserts and an associated tool holder for a milling cutting tool system of this invention with seven identical parallelogram-shaped cutting inserts and an associated tool holder.
Figure 8:
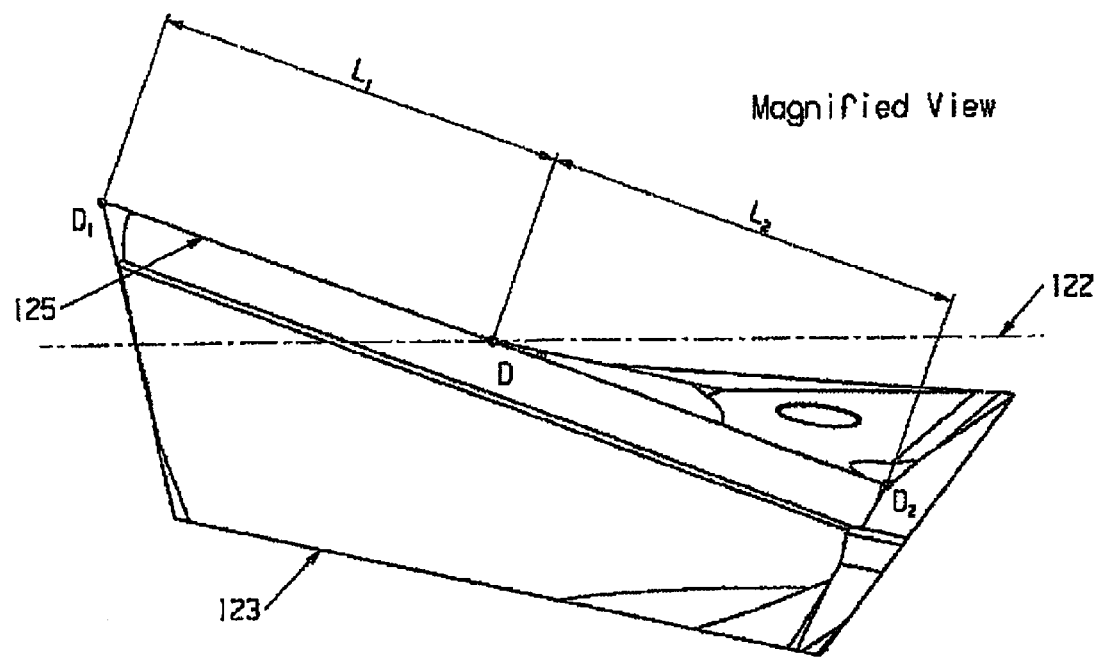

Through a thorough study, the inventors surprisingly found that a more balanced and efficient milling operation can be achieved by positioning the cutting inserts in a tool holder in the above-described manner, which can also be mathematically expressed by the following set of equations. For example, the best performance is achieved in machining difficult-to-machine specialty metals when a cutting insert wherein the rake angles are designed according to the several equations of above Eq. (1) is seated in the associated tool holder. Such a position for the parallelogram-shaped cutting inset can be mathematically defined by applying the following set of equations. The projected side view shown in FIG. 8 is obtained by rotating the tool holder 121 around the axis of rotation 122, which is collinear with the X axis of the Cartesian coordinate system as illustrated, until the bottom surface 123 of the cutting insert 124 (as an example) is perpendicular to the X-Y plane (equivalent to the secondary radial plane 104 as shown in FIG. 7b) of the Cartesian coordinate system. Thus, the first equation for positioning the middle point D (as shown in the Magnified View of FIG. 8) of the main cutting edge 125 so as to intersect the axis of rotation 122 of the tool holder 121 in the X-Z plane of FIG. 8, or in other words, positioning the middle point D in the X-Z plane which is equivalent to the primary radial plane 102 as shown in FIG. 7b, can be mathematically expressed as:

$$L_1 = L_2 = L/2 \qquad \text{Eq. (2)}$$

where, as shown at the Magnified View in FIG. 8, $L_1$ is the length of the main cutting edge 125 measured from the cutting edge start point $D_1$ to the midpoint D; $L_2$ is the length of the main cutting edge 125 measured from the middle point D to the cutting edge end point $D_2$; and L is the total length of the main cutting edge 125. A reasonable manufacturing tolerance applies to the above equation.

Figure 9:
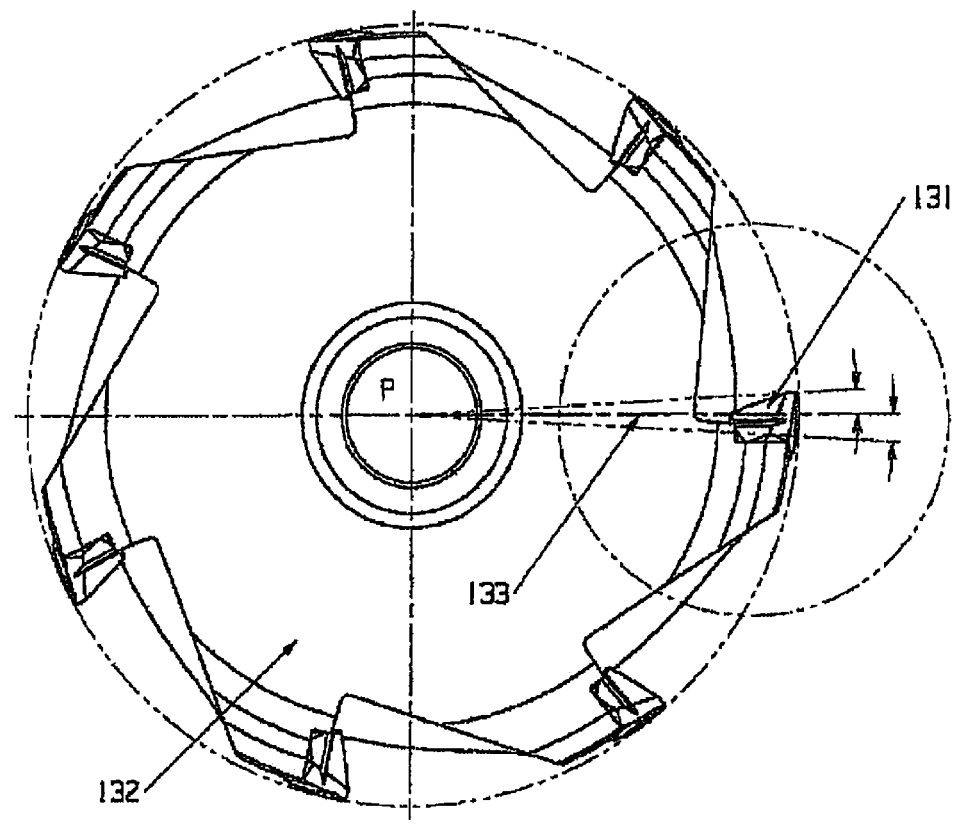
FIG. 9 is a front-end view and a magnified view of a non-limiting embodiment of a milling cutting tool system according to the present disclosure including seven identical parallelogram-shaped cutting inserts and an associated tool holder.
Figure 9:
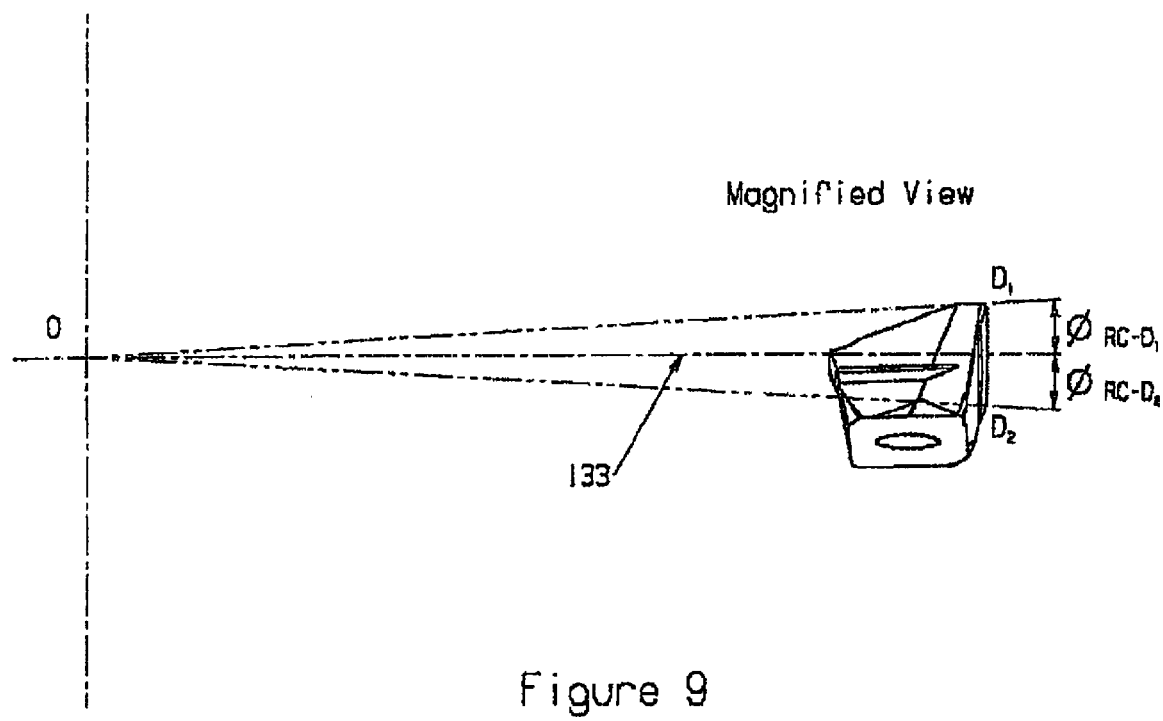

The second equation is to set an equalized radial cutting angle to position each parallelogram-shaped cutting insert, for instance cutting insert 131, in the associated tool holder 132, as shown in the front-end and magnified insert views of FIG. 9, which can be mathematically described as:

$$\emptyset_{RC\text{-}D1} = \emptyset_{RC\text{-}D2} \qquad \text{Eq. (3)}$$

where $\emptyset_{RC\text{-}D1}$ is the radial cutting angle formed between the cutting edge start point $D_1$ in the radial plane with the center at P and the radial center line 133, and $\emptyset_{RC\text{-}D2}$ is the radial cutting angle formed between the cutting edge end point $D_2$ in the radial plane with the center at P and the radial center line 133. A reasonable manufacturing tolerance also applies to the above equation.

When the parallelogram-shaped cutting inserts are designed based on above Eq. (1) and positioned in the associated tool holder according to above Eqs. (2) and (3), improved results can be achieved, including improved stability, balanced performance between cutting efficiency and edge strength, and prolonged tool life in applications of machining difficult-to-machine materials.

Furthermore, certain non-limiting embodiments according to the present disclosure relate to multiple parallelogram-shaped cutting inserts and an associated tool holder. It will be understood, however, that inserts and tool holders within the scope of the present disclosure may be embodied in forms and applied to end uses that are not specifically and expressly described herein. For example, one skilled in the art will appreciate that embodiments within the scope of the present disclosure and the following claims may be manufactured as cutting inserts and/or tool holders adapted for other methods of removing metal from all types of work materials.

Certain non-limiting embodiments according to the present disclosure are directed to parallelogram-shaped cutting inserts providing a combination of advantages exhibited by varying the radial rake angle along the main cutting edge to achieve balanced and optimal performance between efficient cutting action and an enhanced cutting edge. The parallelogram-shaped cutting inserts described herein may be of conventional size and adapted for conventional use in a variety of machining applications. Certain other embodiments according to the present disclosure are directed to a tool holder and a unique and quantitative method to determine how to position parallelogram-shaped cutting inserts in the tool holder to achieve optimized performance for the cutting inserts and the tool holder as an entity.

It will be understood that the present description illustrates those aspects of the invention relevant to a clear understanding of the invention. Certain aspects that would be apparent to those of ordinary skill in the art and that, therefore, would not facilitate a better understanding of the invention have not been presented in order to simplify the present description. Although only a limited number of embodiments of the present invention are necessarily described herein, one of ordinary skill in the art will, upon considering the foregoing description, recognize that many modifications and variations of the invention may be employed. All such variations and modifications of the invention are intended to be covered by the foregoing description and the following claims.

The invention claimed is:

1. A generally parallelogram-shaped cutting insert, comprising:
   a top face;
   first and second main radial clearance faces, each intersecting the top face;
   first and second minor axial clearance faces, each intersecting the top face and connecting the first and second main radial clearance faces;
   a main cutting edge at the intersection of the top face and the first main radial clearance face; and
   a variable radial rake angle along the length of the main cutting edge, the main cutting edge comprising a portion having a positive radial rake angle and a portion having a negative radial rake angle;
   wherein the first main radial clearance face and the second main radial clearance face each comprise at least two radial clearance surfaces; and
   the first minor axial clearance face and the second minor axial clearance face each comprise at least two axial clearance surfaces.

2. The generally parallelogram-shaped cutting insert of claim 1, wherein the radial rake angle of the main cutting edge changes from a positive radial rake angle to a negative radial rake angle along the main cutting edge.

3. The generally parallelogram-shaped cutting insert of claim 1, further comprising:
   a main corner nose.

4. The generally parallelogram-shaped cutting insert of claim 1, wherein the radial rake angle of the main cutting edge near the main corner nose is positive.

5. The generally parallelogram-shaped cutting insert of claim 4, wherein the radial rake angle is zero at least at one point along the main cutting edge.

6. The generally parallelogram-shaped cutting insert of claim 5, wherein the radial rake angle is zero at only one point along the main cutting edge.

7. The generally parallelogram-shaped cutting insert of claim 1, wherein the length of the portion of the main cutting edge having a positive radial rake angle is at least three times longer than the length of the portion of the main cutting edge having a negative radial rake angle.

8. The generally parallelogram-shaped cutting insert of claim 1, further comprising:
   a cutting edge at the intersection of the top face and the first main radial clearance face; and
   a cutting edge at the intersection of the top face and the second main radial clearance face;
   wherein each cutting edge includes a variable radial rake angle along the length of the cutting edge, the main cutting edge comprising a portion having a positive radial rake angle and a portion having a negative radial rake angle.

9. The generally parallelogram-shaped cutting insert of claim 8, further comprising:
   a bottom face; and
   two minor cutting edges, each minor cutting edge comprising at least a first portion and a second portion, wherein the first portion comprises a facet edge parallel to the bottom face and the second portion at an angle to the facet edge of the first portion.

10. The generally parallelogram-shaped cutting insert of claim 1, further comprising:
    two main corner noses and two minor corner noses, each major corner nose and each minor corner nose connecting a main cutting edge and a minor cutting edge, and wherein each of the main corner noses is one of a full nose and a truncated nose.

11. The generally parallelogram-shaped cutting insert of claim 1, wherein at least one radial clearance face includes a notch.

12. The generally parallelogram-shaped cutting insert of claim 1, wherein at least one radial clearance face includes a notch extending across the entire radial clearance face.

13. The generally parallelogram-shaped cutting insert of claim 1, wherein at least one axial clearance face includes a notch.

14. The generally parallelogram-shaped cutting insert of claim 13, wherein at least one axial clearance face includes a notch extending across at least a portion of the axial clearance face.

15. A peripheral cutting tool, comprising:
a tool holder comprising at least one insert pocket; and
a generally parallelogram-shaped cutting insert comprising a main cutting edge, wherein the cutting insert is positioned in the insert pocket of the tool holder such that a midpoint of the main cutting edge is located in a primary radial plane comprising the axis of rotation of the tool holder, and wherein a support plane including a bottom surface of the insert pocket is perpendicular to a secondary radial plane that comprises the axis of rotation of the tool holder and is perpendicular to the primary radial plane;
wherein the generally parallelogram-shaped cutting insert comprises:
a top face;
first and second main radial clearance faces, each intersecting the top face;
first and second minor axial clearance faces, each intersecting the top face and connecting the first and second main radial clearance faces;
a main cutting edge at the intersection of the top face and the first main radial clearance face; and
a variable radial rake angle along the length of the main cutting edge, the main cutting edge comprising a portion having a positive radial rake angle and a portion having a negative radial rake angle.

16. The peripheral cutting tool of claim 15, wherein the radial rake angle of the main cutting edge changes from a positive radial rake angle to a negative radial rake angle along the main cutting edge.

17. The peripheral cutting tool of claim 16, wherein the length of the portion of the main cutting edge having a positive radial rake angle is at least three times longer than the length of the portion of the main cutting edge having a negative radial rake angle.

18. The peripheral cutting tool of claim 15, wherein the generally parallelogram-shaped cutting insert comprises a main corner nose.

19. The peripheral cutting tool of claim 15, wherein the radial rake angle of the main cutting edge near the main corner nose is positive.

20. The peripheral cutting tool of claim 15, wherein the parallelogram-shaped cutting insert comprises:
a cutting edge at the intersection of the top face and the first main radial clearance face; and
a cutting edge at the intersection of the top face and the second main radial clearance faces;
wherein each such cutting edge has a variable radial rake angle along the length of the cutting edge, each such cutting edge comprising a portion having a positive radial rake angle and a portion having a negative radial rake angle.

21. A method for positioning a generally parallelogram-shaped cutting insert comprising a main cutting edge in an insert pocket of a tool holder of peripheral cutting tool, the method comprising:
positioning the cutting insert in the insert pocket so that a midpoint of the main cutting edge is located in a primary radial plane comprising the axis of rotation of the tool holder, and wherein a support plane including a bottom surface of the insert pocket is perpendicular to a secondary radial plane that comprises the axis of rotation of the tool holder and is perpendicular to the primary radial plane;
wherein the generally parallelogram-shaped cutting insert comprises:
a top face;
first and second main radial clearance faces, each intersecting the top face;
first and second minor axial clearance faces, each intersecting the top face and connecting the first and second main radial clearance faces;
a main cutting edge at the intersection of the top face and the first main radial clearance face; and
a variable radial rake angle along the length of the main cutting edge, the main cutting edge comprising a portion having a positive radial rake angle and a portion having a negative radial rake angle.

22. The method of claim 21, wherein the radial rake angle of the main cutting edge changes from a positive radial rake angle to a negative radial rake angle along the main cutting edge.

23. The method of claim 21, wherein the generally parallelogram-shaped cutting insert comprises a main corner nose.

24. The method of claim 21, wherein the radial rake angle of the main cutting edge near the main corner nose is positive.

25. The method claim 21, wherein the length of the portion of the main cutting edge having a positive radial rake angle is at least three times longer than the length of the portion of the main cutting edge having a negative radial rake angle.

26. A generally parallelogram-shaped cutting insert, comprising:
a top face;
a bottom face;
first and second main radial clearance faces, each intersecting the top face;
first and second minor axial clearance faces, each intersecting the top face and connecting the first and second main radial clearance faces;
a main cutting edge at the intersection of the top face and the first main radial clearance face;
a variable radial rake angle along the length of the main cutting edge, the main cutting edge comprising a portion having a positive radial rake angle and a portion having a negative radial rake angle;
a cutting edge at the intersection of the top face and the first main radial clearance face;
a cutting edge at the intersection of the top face and the second main radial clearance face;
wherein each cutting edge includes a variable radial rake angle along the length of the cutting edge, the main cutting edge comprising a portion having a positive, radial rake angle and a portion having a negative radial rake angle; and
two minor cutting edges, each minor cutting edge comprising at least a first portion and a second portion, wherein the first portion comprises a facet edge parallel to the bottom face and the second portion at an angle to the facet edge of the first portion.

27. The generally parallelogram-shaped cutting insert of claim 26, wherein the radial rake angle of the main cutting edge changes from a positive radial rake angle to a negative radial rake angle along the main cutting edge.

28. The generally parallelogram-shaped cutting insert of claim 26, further comprising:
   a main corner nose.

29. The generally parallelogram-shaped cutting insert of claim 26, wherein the radial rake angle of the main cutting edge near the main corner nose is positive.

30. The generally parallelogram-shaped cutting insert of claim 29, wherein the radial rake angle is zero at least at one point along the main cutting edge.

31. The generally parallelogram-shaped cutting insert of claim 30, wherein the radial rake angle is zero at only one point along the main cutting edge.

32. The generally parallelogram-shaped cutting insert of claim 26, wherein the length of the portion of the main cutting edge having a positive radial rake angle is at least three times longer than the length of the portion of the main cutting edge having a negative radial rake angle.

33. The generally parallelogram-shaped cutting insert of claim 26, further comprising:
   two main corner noses and two minor corner noses, each major corner nose and each minor corner nose connecting a main cutting edge and a minor cutting edge, and wherein each of the main corner noses is one of a full nose and a truncated nose.

34. The generally parallelogram-shaped cutting insert of claim 26, wherein
   the first main radial clearance face and the second main radial clearance face each comprise at least two radial clearance surfaces; and
   the first minor axial clearance face and the second minor axial clearance face each comprise at least two axial clearance surfaces.

35. The generally parallelogram-shaped cutting insert of claim 26, wherein at least one radial clearance face includes a notch.

36. The generally parallelogram-shaped cutting insert of claim 26, wherein at least one radial clearance face includes a notch extending across the entire radial clearance face.

37. The generally parallelogram-shaped cutting insert of claim 26, wherein at least one axial clearance face includes a notch.

38. The generally parallelogram-shaped cutting insert of claim 37, wherein at least one axial clearance face includes a notch extending across at least a portion of the axial clearance face.

* * * * *